United States Patent [19]
Aboujaoude

[11] Patent Number: 5,502,543
[45] Date of Patent: Mar. 26, 1996

[54] SYSTEM FOR COLLECTING STATISTICAL DATA ON REMOTELY MONITORED MACHINES

[75] Inventor: Jodi F. Aboujaoude, West Henrietta, N.Y.

[73] Assignee: Xerox Corporation, Stamford, Conn.

[21] Appl. No.: 267,685

[22] Filed: Jun. 28, 1994

[51] Int. Cl.⁶ .................................................. G03G 15/00
[52] U.S. Cl. ........................................... 355/202; 379/106
[58] Field of Search ........................... 355/200, 202–206; 364/138; 379/100, 106

[56] References Cited

U.S. PATENT DOCUMENTS

| | | | |
|---|---|---|---|
| 4,549,044 | 10/1985 | Durham | 379/106 X |
| 4,764,952 | 8/1988 | Felin | 379/107 |
| 5,057,866 | 10/1991 | Hill, Jr. et al. | 355/200 |
| 5,305,055 | 4/1994 | Ebner et al. | 355/200 |
| 5,305,199 | 4/1994 | LoBiondo et al. | 364/403 |
| 5,369,471 | 11/1994 | Yamada | 355/206 X |

*Primary Examiner*—Joan H. Pendegrass
*Attorney, Agent, or Firm*—Fay, Sharpe, Beall, Fagan, Minnich & McKee

[57] ABSTRACT

A remote copier monitor system provides data transmission with minimal copier inconvenience and lessened carrier rates. One or more monitors are provided with the document processing machine, such as a copier. The monitor includes its own intelligence, memory, real time clock, and data transmitter. The monitor is provided with information relating to carrier rates associated with time or date. The system monitors activities such as copies being made and machine on time. The information is correlated with that obtained from the real time clock and the toll rate schedule data to initiate a remote data contact and transfer.

19 Claims, 9 Drawing Sheets

(FURTHER INITIALIZATION)

SYSTEM FOR COLLECTING STATISTICAL DATA ON REMOTELY MONITORED MACHINES

BACKGROUND OF THE INVENTION

This application pertains to the art of remote data monitoring, and more particularly to that of an efficient system for remotely communicating document processing machine status information.

The invention is particularly applicable to monitoring copiers in a heavy usage environment and will be described with particular reference thereto. However, it will be appreciated that the invention has broader applications, such as in any periodic, remote machine monitoring for which minimum inconvenience and minimized toll rates are desirable.

Document processing has become a vital, ingrained part of virtually every business. Document processing machines, such as copiers, are becoming increasingly complex in their capabilities. At the same time, businesses are placing increasing reliance on these machines. Any downtime of the machine provides a significant effect on business productivity.

There are known advantages associated with remote monitoring of document processing devices. With such devices, machine status, such as sensed exhaustion of expendable supplies, parts, and the like, have been used to initiate a remote data transmission.

For example, U.S. Pat. No. 5,305,055 to Ebner et al., commonly owned by the assignee hereof, teaches a system for automatic notification to a selected, remote station of machine conditions. Other earlier systems, such as those disclosed within the Ebner et al. patent, recognize and address, to varying degrees, the desirability of remote machine monitoring.

Because remote monitoring is desirable, and even necessary, a large number of systems have been developed to accomplish this objective. However, most earlier systems are concerned only with monitoring and communication of data. They are not concerned with interruption of machine operation or charges associated with communication. These concerns are of increasing significance as monitoring becomes more ubiquitous. This is especially true in an environment where a large number of machines are used and are monitored concurrently.

The present invention contemplates a new and improved system selectively initiating a remote notification and data transfer which overcomes all of the above-referred problem, and others, and provides a mechanism which is less invasive from the monitored machine perspective and more economical in its data transmission.

In accordance with the subject invention, there is provided a system for remote monitoring of equipment which includes an interface for acquiring status data representative of a status of a document processing apparatus. A central processor unit is provided with memory, a real time clock, and a communication device, such as a modem. The memory includes information associated with toll rates, such as long distance charges associated with a communication session. The CPU correlates the call rate information, real time clock information, and machine status data to determine an optimal time for completing a data connection and transfer.

An advantage of the present invention is the provision of a system for efficient interconnection between a document processing machine and a remote, information processing apparatus.

Still another advantage of the present invention is the provision of a remote data connection system which provides minimal inconvenience to the document processing machine.

Yet another advantage of the present invention is the provision of a remote communication system which minimizes toll rates associated with its data communication activity.

Further advantages will be apparent upon a reading and understanding of the subject disclosure.

BRIEF DESCRIPTION OF THE DRAWINGS

The invention may take physical form in certain parts and arrangements in parts, a preferred embodiment of which will be described in detail in this specification and illustrated in the accompanying drawings which form a part hereof and wherein.

DETAILED DESCRIPTION OF THE PREFERRED EMBODIMENT

Figure 1:
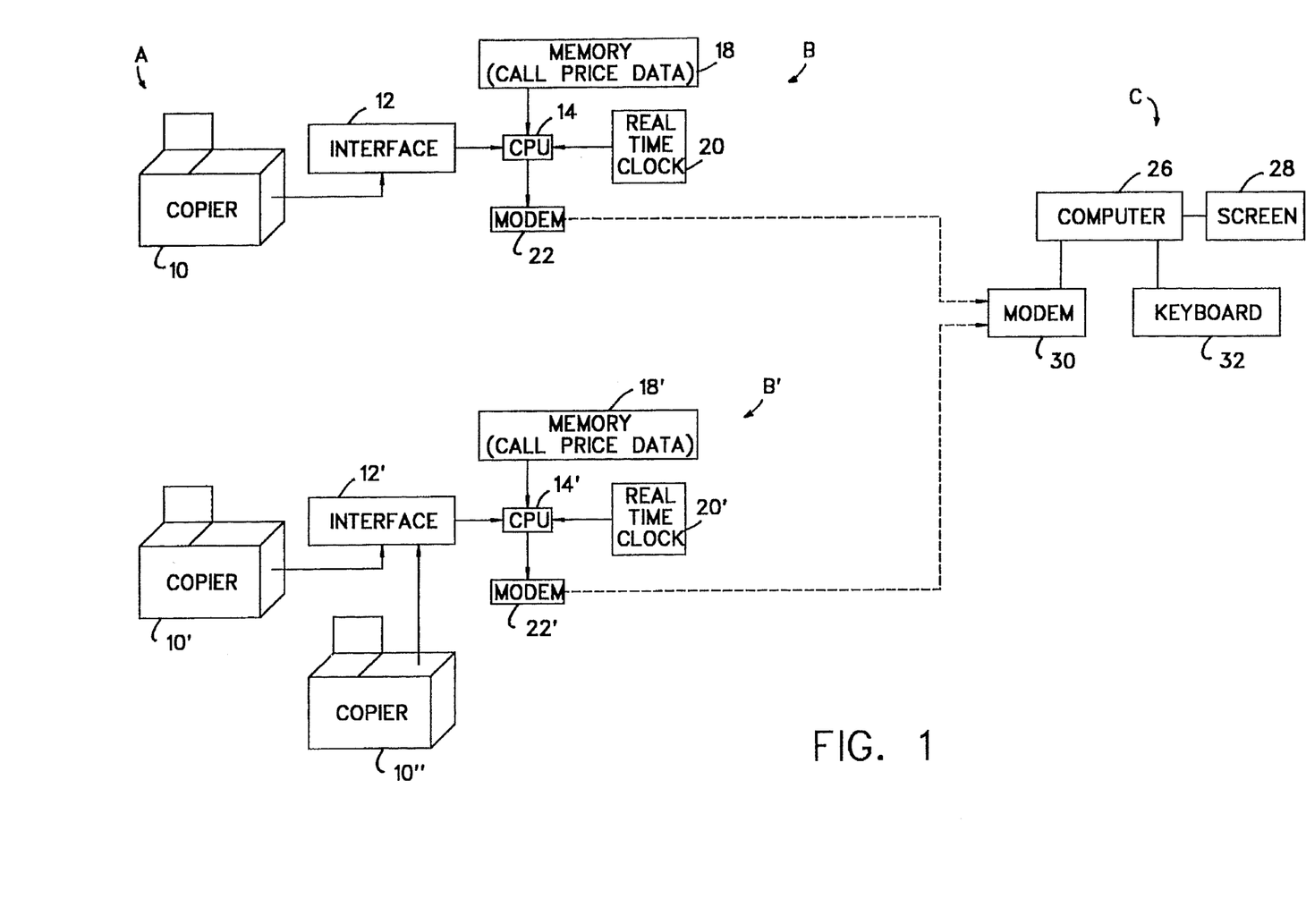
FIG. 1 is a block diagram of the machine interface unit and remote data unit of the subject invention.

Referring now to the drawings wherein the showings are for the purpose of illustrating the preferred embodiment of the invention only, and not for the purpose of limiting the same, FIG. 1 illustrates a complete monitor/acquisition system A. The system A includes a local portion B and a remote portion C.

The local portion B includes the document processing machine itself, as well as the interface and intelligence therefor.

In the illustrated embodiment, the document processing machine is a copier 10, such as that which is available today. Such common copiers include a mechanism for counting each copy made thereon and providing an output of such copy or count data. Such conventional copiers also provide a mechanism by which machine "on time" data may be communicated. An interface 12 is provided in data communication with the copier 10. The interface 12 takes data from the copier, such as the noted count data and on time data, and communicates it to a central processor unit ("CPU"), 14. The CPU 14 is, in turn, in communication with a memory 18, a real time clock 20, and a modem 22. The memory 18 is suitably comprised of non-volatile random access memory ("RAM"), disposed within an address space of CPU 14. In the preferred embodiment, the memory 18 is also provided with a non-volatile memory segment, such as a hard disk, which is adapted for storage of call price data which will be detailed further below.

The memory 18 also provides for storage of a selected routine to direct the CPU 14. This routine, as will be detailed below, functions to correlate data acquired from the copier 10 via interface 12, call price data disposed in the memory 18, and real time data acquired from real time clock 20, to initiate a communication session and data transfer.

Selected communication from the local portion B is accomplished via modem 22. This connection is made to the remote portion C. The remote portion C, itself, includes a computer 26, a video display device, such as screen 28, a complementary modem 30, and an input device, such as keyboard 32. The remote portion C provides a means by which data may be acquired from a remotely initiated communication session, correlated and communicated. The particular software for accomplishing this is well within the understanding of one of ordinary skill in the art and will not be repeated herein.

Also illustrated in FIG. 1 is a remote portion B'. The portion B' is provided to exemplify a mechanism by which multiple, local units may be illustrated as communicating with a single remote portion C. In each instance, a primed numeric designation, corresponding to that provided in local portion B, above, has been provided. It will be appreciated that the primed designations in each instance, function analogously to that noted earlier. Additionally, the interface 12' will be noted to communicate with a second copier 10". Thus, the intelligence portion of the CPU 14', memory 18', real time clock 20', and modem 22', as well as the interface 12', may be shared by a plurality of document processing units. However, the correlation and initiation of remote data sessions is the same as that in connection with the unit B.

Figure 2:
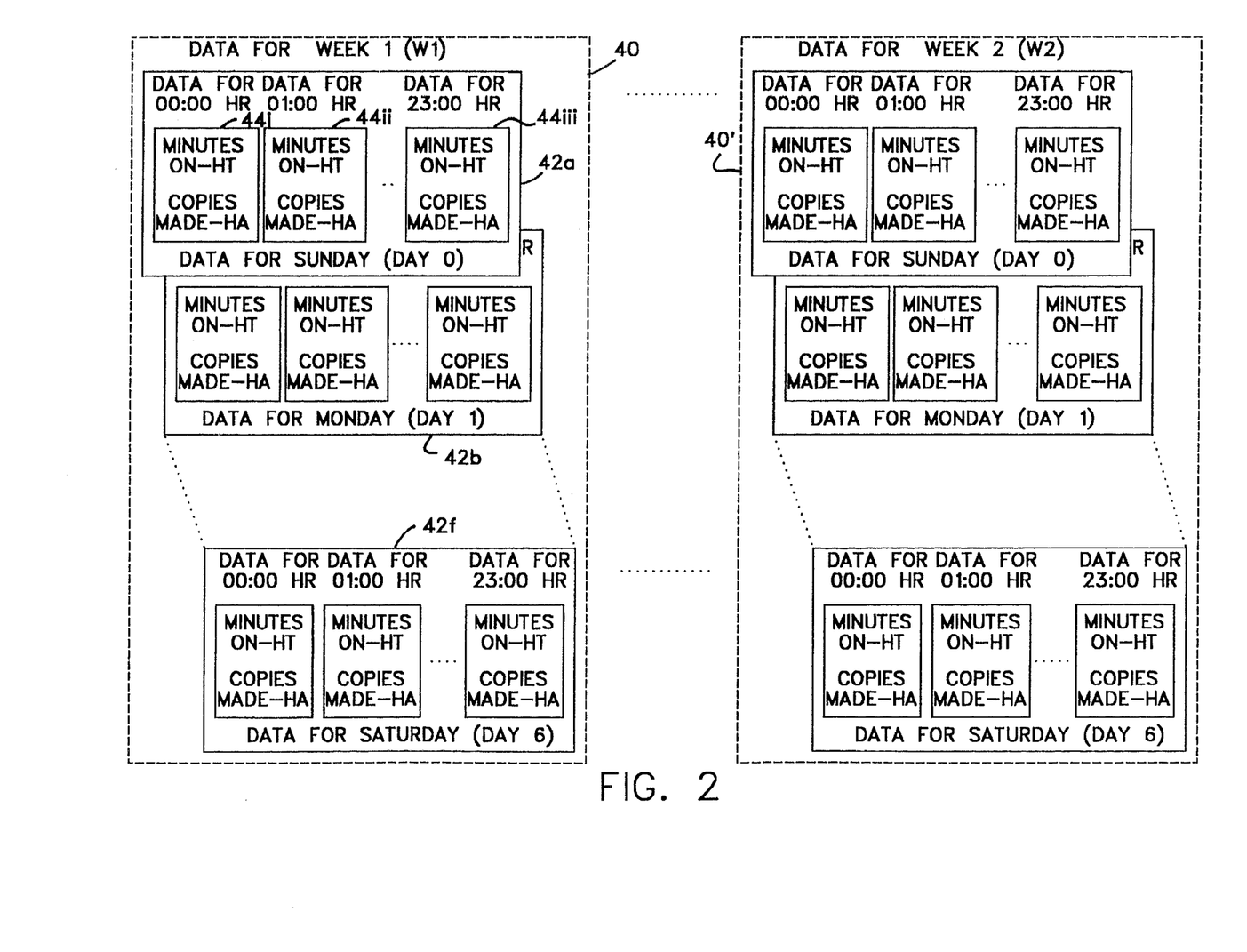
FIG. 2 illustrates the data storage hierarchy implemented by the system of FIG. 1.

Turning now to FIG. 2, illustrated is the preferred memory organization for data collection associated with each local portion. The memory organization of the preferred embodiment is hierarchically disposed and data associated with a given week (week 1) 40. Included therein is a record 42 for each day within that week. As illustrated, record 42a is provided for Sunday, 42b for Monday, through 42f for Sunday. The record associated with each day, is in turn, provided with data representative an hourly poll of monitored copy parameters. In the preferred embodiment, such polling is provided in 24 increments 44i through 44xxiv. As noted above, the preferred embodiment provides records of data associated with the time a given machine is on, as well as copies made.

It will be appreciated from the foregoing that the monitored copier status data, is ultimately categorized in quantized time units. The data is accumulated hourly, and cataloged daily, as well as weekly. This is accomplished by the comparison of the data with the real time data acquired from the real time clock 20 (FIG. 1).

It will be noted that data from week 1, such as that illustrated by block 40 is also acquired from 4 subsequent weeks. Such a representative week is illustrated at block 40'. It will be appreciated that the contents of block 40' are analogous to that of 40 noted above.

Figure 3:
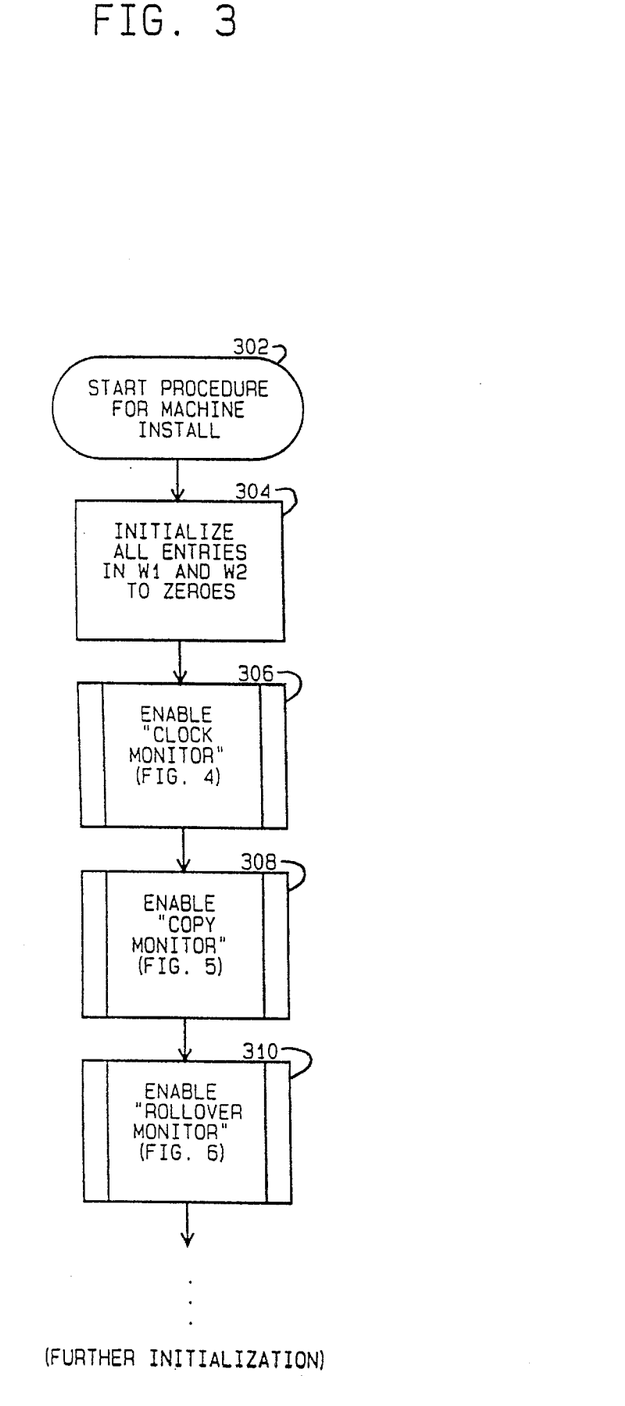
FIG. 3 illustrates a flow chart of the machine install procedure of the subject invention.

Turning now to FIG. 3, the procedure associated with commencing the operation of the local portion B will be provided. In this scheme, memory reserved for data collection (W1 and W2) is zeroed. Additionally, all tests included in the data collection are enabled. At block 302, a procedure for installing on a first machine, such as that provided in the local portion B (FIG. 1), is provided. Next, the procedure moves to block 304. At this point, all entries for the week 1 (block 40 of FIG. 2), week 2, etc., are initialized to zero entries. At block 306, a sub-procedure for enabling a clock monitor is provided. This will be detailed further below with FIG. 4. Next, at block 308, a procedure for a copy monitor function is enabled. This will be detailed in connection with FIG. 5, below. At block 310, a procedure for a roll over monitor is commenced. This will be detailed with FIG. 6, below. From this point, any other additional initialization which may be required may be completed.

Figure 4:
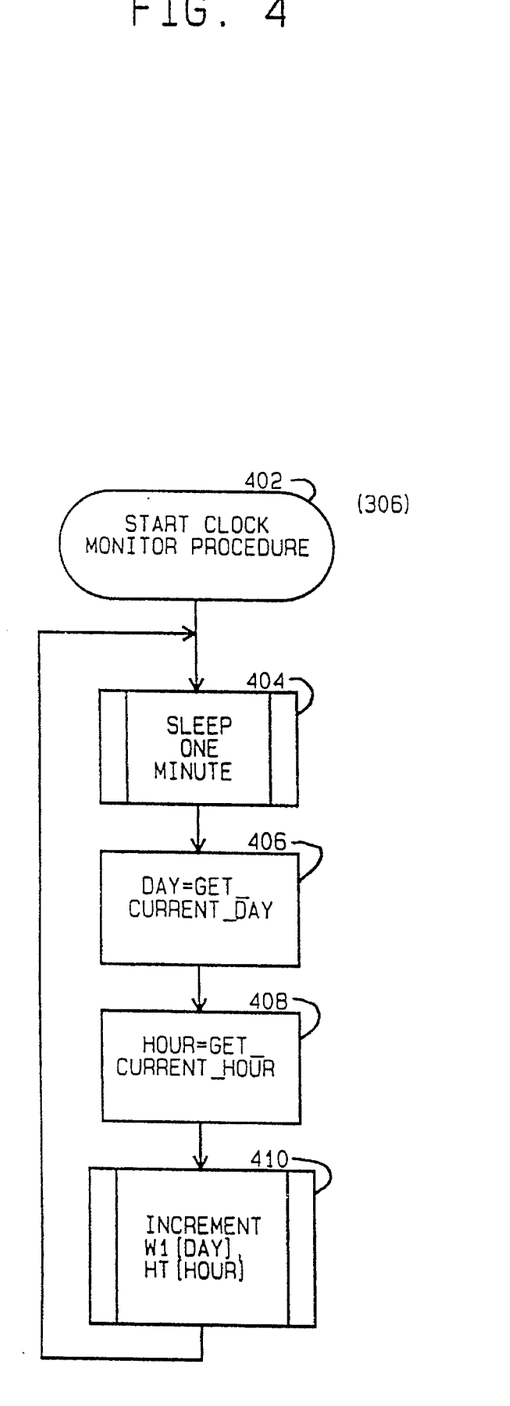
FIG. 4 is a flow chart of the clock monitor procedure of the subject invention.

Turning now to FIG. 4, the procedure for enabling the clock monitor (initialized in block 306, FIG. 3), will be detailed. This scheme functions to "wake up" (i.e., activate a document process), on every one minute interval. When awakened, it reads the real time clock, filters out the day value (Day) and hour value (Hour), and increments a time on count (HT) in a memory location corresponding to the day and hour.

The clock monitor procedure is commenced at block 402. At this point, a procedure to await a one minute increment is provided. This is referred to as a one minute "sleep" mode. After tolling of the one minute duration, a current day value is secured from the real time clock 20 (FIG. 1). At block 408, a current hour value is similarly obtained. Finally, at block 410, the place holder value W1, representative of the obtained day value, and HT, representative of the hour value, an associated data matrix is incremented. The procedure then loops back to block 404. It will be appreciated that thus, a data entry value is obtained for each matrix place holder in one minute intervals in the preferred embodiment.

Figure 5:
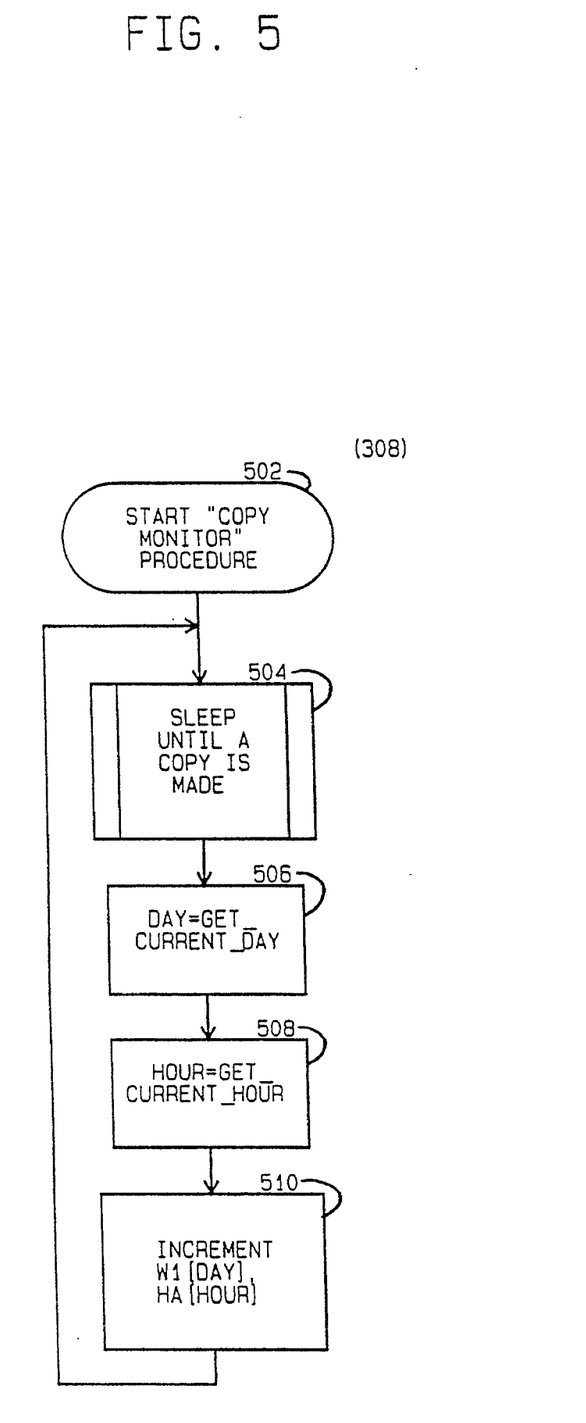
FIG. 5 is a flow chart of a copy monitor procedure of the subject invention.

Turning now to FIG. 5, the procedure for copy monitoring (initialized at block 308 of FIG. 3), will be detailed. This test wakes up whenever a copy is made. It reads the clock, filters the values Day and Hour, and increments the copy count (HA) in the memory location corresponding to the day and hour value referenced.

The copy monitor procedure is commenced at block 502. Next, a sleep mode is made until indication is received from the copier 10 (FIG. 1) that a copy is made. When so triggered, a value representative of a current day is obtained from real time clock 20 in block 506. Similarly, a value representative of a current hour is obtained from real time clock 20 in block 508. In block 510, the place holders are incremented and the procedure loops back to block 504.

Figure 6:
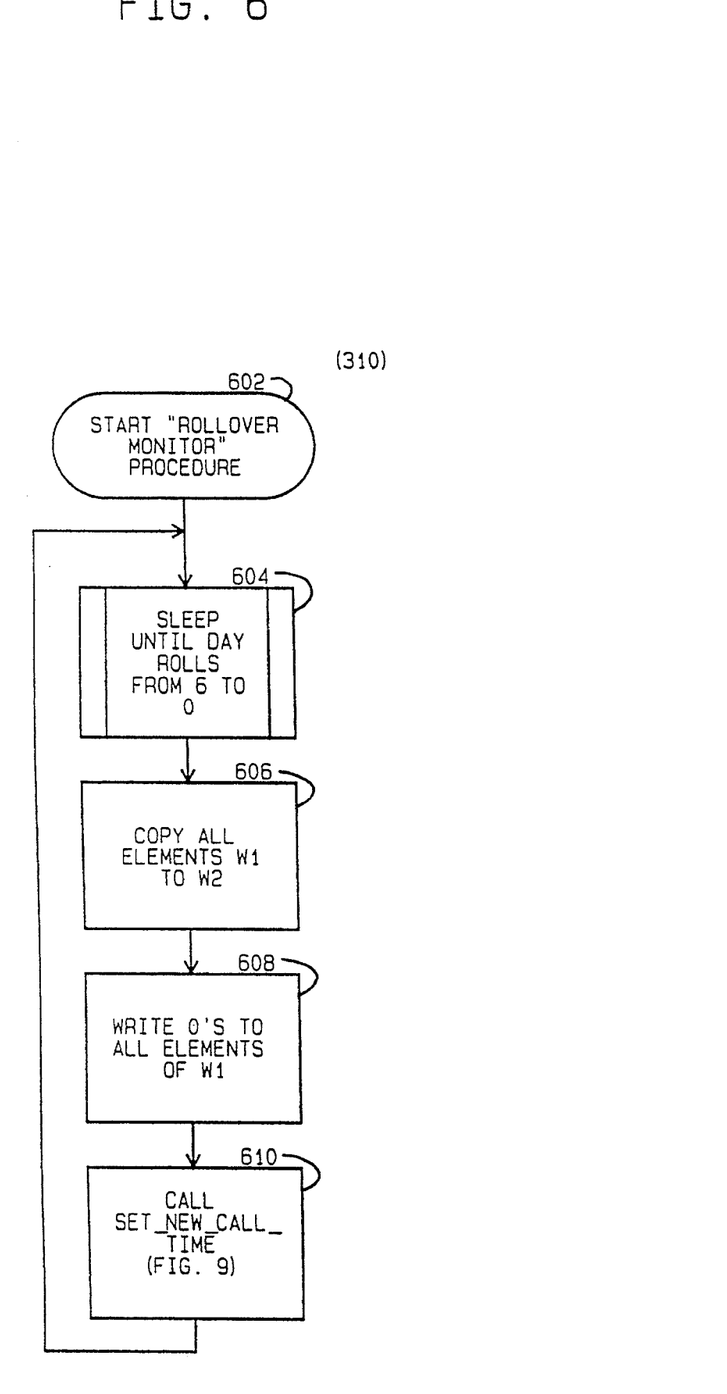
FIG. 6 is a flow chart of a roll over monitor procedure of the subject invention.

Turning now to FIG. 6, the roll over monitor procedure (initialized in block 310 of FIG. 3), will be detailed. This rollover monitor procedure wakes up whenever the value Day rolls over from 6 to 0, indicating that a new week has started. It calls the Set_New_Call_Time procedure (FIG. 9, below), and moves collected data from W1 to W2 to start data collection for a new week.

The procedure is commenced at block 602. In analogous fashion to that noted above, block 604 results in a sleep until a week is incremented, as evidenced by a day roll over from 6 to 0. When so triggered, all elements of week 1 (W1) are copied to week 2 (W2). Zeros are then written to all elements of W1 at block 608. A new call time value, for a next report, is initiated at block 610. From this point, the procedure returns to block 604 and awaits another week roll over.

Figure 7:
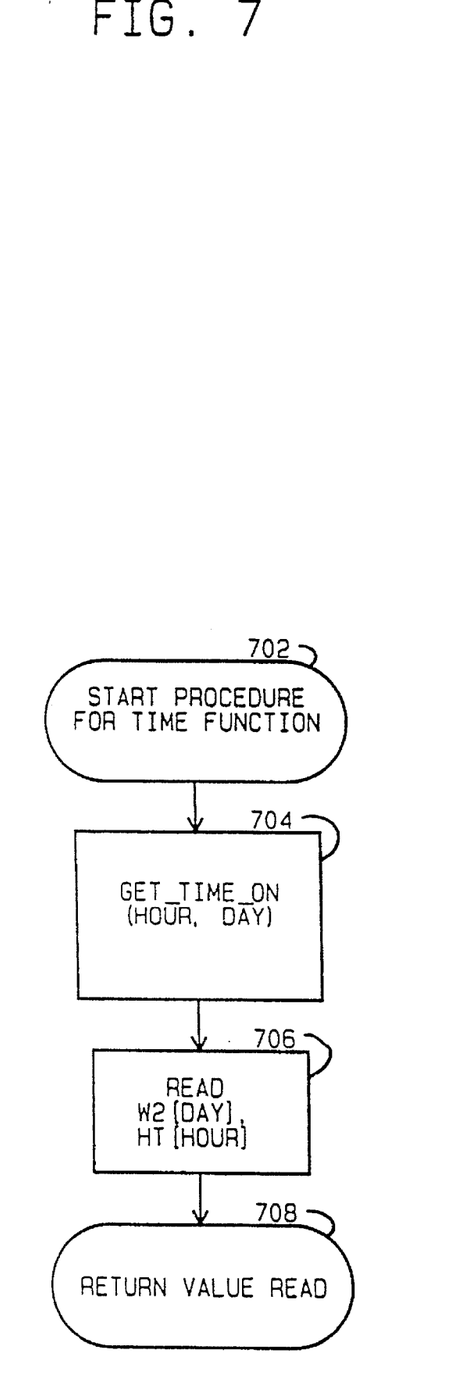
FIG. 7 is a flow chart of a time function procedure of the subject invention.

A time function procedure associated with a real time clock data acquisition is provided in FIG. 7. The Get_Time_On function returns the number of minutes the machine was on during the hour period of the week specified by the input parameters.

The procedure is commenced at block 702. Next, at block 704, a real time value of an hour and day value is obtained. This is read at block 706 from the week W2 value, noted above. The procedure is returned at block 708.

Figure 8:
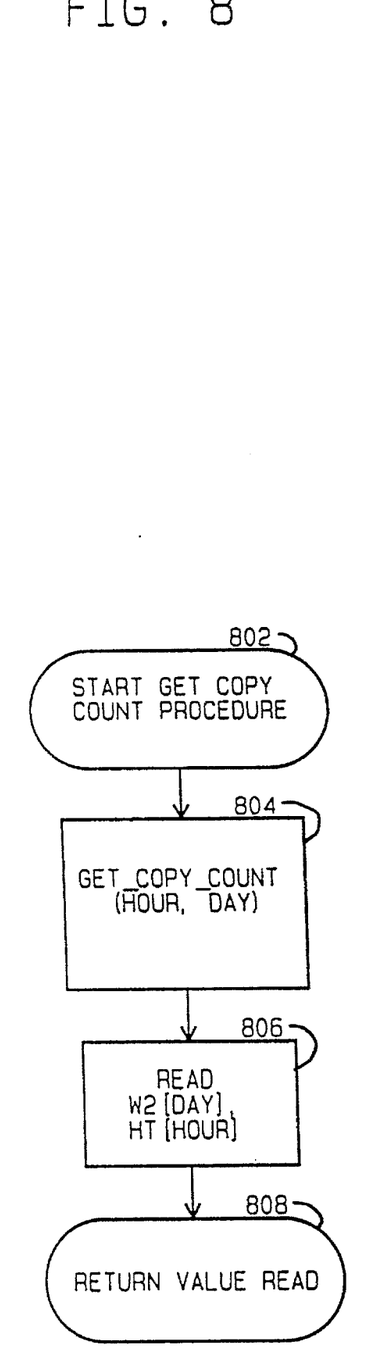
FIG. 8 is a flow chart of the copy count retrieval procedure of the subject invention.

Turning now to FIG. 8, the procedure for obtaining a copy count is detailed. The Get_Copy_Count function returns a number of copies made during the hour period of the week specified by the input parameters Hour and Day. The procedure is commenced at block 802. From this point, the copy count data, comprised of an hour and day value, is obtained at block 804. The W2 day value and HT hour value is then read at block 806. The read values are returned at block 808.

Figure 9:
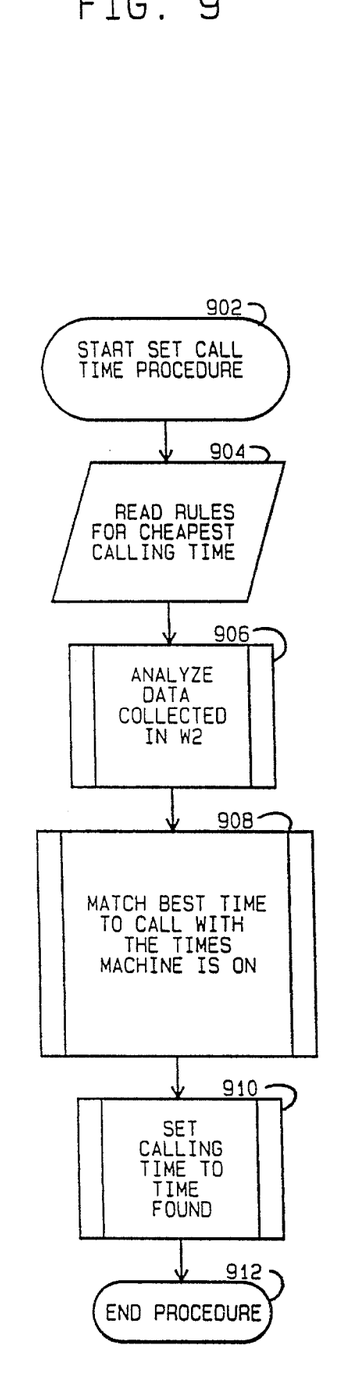
FIG. 9 is a flow chart of a set call time procedure of the subject invention.

In FIG. 9, the actual procedure for dictating when a remote data communication between the local portion B and remote portion C (FIG. 1), is detailed. The Set_New_Call_Time function is called whenever the value Day rolls over from 6 to 0, indicating that a new week has started. It checks rules (entered in memory in accordance with the machine's location), for a least expensive call time. The routine searches the W2 data, searching from non-zero HT entries (number of minutes machine was on), starting with least expensive time down, progressing to regular business hours.

The procedure is commenced at block 902. Next, in block 904, the preset rules detailing the cheapest call time are analyzed. This is correlated with acquired data in block 906. A match is made between the call rates, as well a copier on-time and activity in block 908 to determine an optimal call period. Such optimal call period is application specific. The function of FIG. 9 is called whenever a day value rolls from 6 to 0, as noted above, in connection with FIG. 6. This indicates that a new week has started. The rules are checked while going through data collected in the W2 array, searching for non-zero HT entries. This is representative of a number of minutes the machine was on during that hour. See, for example, FIG. 2. A determination is made based on least expensive downtime or least intrusive performance penalty as it correlates to regular business hours. In block 910, the best match calling time is determined and the remote data transfer completed. The procedure ends at block 912. In this fashion, irregular, periodic data acquisition reporting is obtained. Regular reports are made, which reports correlate with minimal interference with copier activity, as well as taking into consideration lessened toll charges.

This invention has been described with reference to the preferred embodiment. Obviously, modifications and alterations will occur to others upon the reading and understanding of the specification. It is intended that all such modifications and alterations be included insofar as they come within the scope of the appended claims or the equivalents thereof.

Having thus described the invention, it is now claimed:

1. A system for remote monitoring of a printing machine comprising:

interface means for acquiring status data representative of a status of an associated printing machine;

a central processor unit;

a memory unit addressable by the central processor unit;

means for communicating the status data to the memory unit;

a real time clock for generating real time data;

means for communicating the real time data to the central processor unit;

call price data, representative of call rates, disposed in the memory unit;

the central processor unit including comparison means for comparing the call price data, the status data and the real time data; and signal means for selectively initiating a remote data connection as a result of a comparison of the call price data, the status data and the real time data.

2. The system for remote monitoring of a printing machine of claim 1 further comprising data transfer means responsive to the signal means adapted for communicating the status data to an associated remote data processing device.

3. The system for remote monitoring of a printing machine of claim 2 wherein the interface means includes means for acquiring the status of data comprised of at least one of: (i) interval data representative of an interval during which the associated printing machine was active and (ii) volume data representative of a number of documents printed by the associated printing machine.

4. The system for remote monitoring of a printing machine of claim 3 wherein the comparison means includes means for quantizing the status data in accordance with a selected time interval as specified by the real time data.

5. The system for remote monitoring of a printing machine of claim 4 wherein the signal means includes means for initiating a remote data connection in accordance with a determination of a least expensive call period, and a period of minimal use of the associated printing machine as determined from at least one of the interval data and the volume data.

6. The system for remote monitoring of a printing machine of claim 5 further comprising means for periodically flushing the memory means from previous status data.

7. The system for remote monitoring of a printing machine of claim 6 further comprising a remote data processing apparatus adapted to be placed in data communication with the data transfer means at a timing and duration dictated by signal means.

8. A method of remote monitoring of a printing machine comprising the steps of:

acquiring status data representative of a status of at least one associated printing machine;

communicating the status data to a memory unit addressable by a central processor unit;

generating real time data;

communicating the real time data to the central processor unit;

storing, in the memory unit, call price data, representative of call rates;

comparing, in the central processor unit, the call price data, the status data and the real time data; and selectively initiating a remote data connection as a result of a comparison of the call price data, the status data and the real time data.

9. The method of remote monitoring of a printing machine of claim 8 further comprising the step of acquiring the status data comprised of at least one of: (i) interval data representative of an interval during which the associated printing machine was active and (ii) volume data representative of a number of documents printed by the associated printing machine.

10. The method of remote monitoring of a printing machine of claim 9 further comprising the step of quantizing the status data in accordance with a selected time interval as specified by the real time data.

11. The method of remote monitoring of a printing machine of claim 10 further comprising the step of communicating the status data to a remote data processing device.

12. The method of remote monitoring of a printing machine of claim 10 further comprising the step of initiating the remote data connection in accordance with a determination of a least expensive call period and a period of minimal use of the associated printing machine, as determined from at least one of the interval data and the volume data.

13. A dynamically timed remote printing machine data interface for periodically reporting printing machine operating characteristics comprising:

a printing machine;

sensor means attached to the printing machine for generating an on signal when the printing machine is enabled;

a counter attached to the printing machine for generating incremental count data for each document printed therefrom;

a real time clock for generating real time clock data;

a central processor unit;

communication means for communicating the count data and the on signal to the central processor unit;

an addressable memory unit operatively connected to the central processor unit;

means for receiving call price data, representative of call rates, into the memory unit;

the central processor unit including comparison means for comparing call price data received into the memory unit, count data generated from the counter and the count data in accordance with preselected standards so as to determine a selected remote transfer period to lower communication charges and coincide with a low printing machine usage period; and signal means for selectively initiating a remote data connection as a result of a comparison of the call price data, the status data and the real time data.

14. The dynamically timed remote printing machine data interface for periodically reporting printing machine operating characteristics of claim 13 further comprising data transfer means responsive to the signal means adapted for communicating at least one of the incremental count data representative of the on signal to an associated remote data processing device.

15. The dynamically timed remote printing machine data interface for periodically reporting printing machine operating characteristics of claim 14 wherein the comparison means includes means for quantizing the status data in accordance with a selected time interval as specified by the real time data.

16. The dynamically timed remote printing machine data interface for periodically reporting printing machine operating characteristics of claim 15 further comprising a remote data processing apparatus adapted to be placed in data communication with the data transfer means at a timing and duration dictated by signal means.

17. The dynamically timed remote printing machine data interface for periodically reporting printing machine operating characteristics of claim 16 further comprising means for periodically flushing the memory means from previous status data.

18. A remote printing machine monitor comprising:

a central processor unit;

a memory unit addressable by the central processor unit;

receiving means adapted for receiving status data from an associated remote printing machine into the memory unit at a timing dictated by the associated remote printing machine, the status data including at least one of (i) interval data representative of an interval during which the associated printing machine was active and (ii) volume data representative of a number of documents printed by the associated printing machine;

wherein the timing is determined as a result of a comparison of call price data, representative of call rates, and the status data.

19. The remote printing monitor of claim 18 further comprising:

correlation means for correlating received status data with preselected criteria; and means for generating an output in accordance with the correlation means.

* * * * *